United States Patent [19]

Kitamura et al.

[11] Patent Number: 5,759,679

[45] Date of Patent: Jun. 2, 1998

[54] ADHESIVE SHEET WITH FOAMED SUBSTRATE

[75] Inventors: Yoshinao Kitamura; Katsunari Oji; Hiroshi Sugawa, all of Osaka, Japan

[73] Assignee: Nitto Denko Corporation, Osaka, Japan

[21] Appl. No.: 711,068

[22] Filed: Sep. 9, 1996

[30] Foreign Application Priority Data

Sep. 15, 1995 [JP] Japan ................... 7-262274
May 14, 1996 [JP] Japan ................... 8-118854

[51] Int. Cl.$^6$ ........................... B32B 7/12
[52] U.S. Cl. ................. 428/317.3; 428/343
[58] Field of Search ................ 428/317.3, 343

[56] References Cited

U.S. PATENT DOCUMENTS 5,334,447  8/1994  Kitamura et al. ............ 428/317.3

FOREIGN PATENT DOCUMENTS 0601582  6/1994  European Pat. Off. .

Primary Examiner—Christopher Raimund
Attorney, Agent, or Firm—Sughrue, Mion, Zinn, Macpeak & Seas, PLLC

[57] ABSTRACT

An adhesive sheet with a foamed substrate, comprising a substrate comprising a foamed elastomer having specific properties, and a layer of a pressure-sensitive adhesive formed on the substrate. Due to use of the substrate having specific properties, the adhesive sheet has excellent adhesive properties to rough surfaces and also has excellent oil resistant adhesive properties.

5 Claims, No Drawings 5,759,679

1

ADHESIVE SHEET WITH FOAMED SUBSTRATE

FIELD OF THE INVENTION

The present invention relates to an adhesive sheet of a sheet-form, a tape-form, etc., with a foamed substrate having a layer of a pressure-sensitive adhesive on a substrate comprising a foam.

BACKGROUND OF THE INVENTION

Adhesive sheets of a sheet-form, a tape-form, etc., each with a foamed substrate formed by forming a layer of a pressure-sensitive adhesive on a substrate prepared by foaming a butyl rubber, a chloroprene rubber, a synthetic resin such as polyethylene, etc., are widely used for fixing mirrors, hooks, name plates, etc., on, for example, walls, tiles, ceilings, etc., of buildings or surfaces, etc., of instruments. Also, adhesive sheets are used for fixing trim members such as side ornaments, emblems, spoilers, etc., to the body of automobiles as described in, for example, U.S. Pat. No. 5,334,447.

According to these adhesive sheets with foamed substrate, by dispersing and relaxing an external force or a vibration applied to the members fixed with the adhesive sheet by the substrate comprising a foam, a strong adhesive force and a strong holding power can be realized. Also, by cushion property of the substrate comprising a foam, an advantage that an adhesive area to an adherend having uneven surface can be widened at press adhering.

Recently, for walls of buildings, building materials and wall papers (cloths) of a design having unevenness have been more preferably used than those having smooth surfaces. Also, with regard to coating of the body of automobiles, lustrous mirror plane finishing is becoming the main stream by the improvement of the leveling technique, but as the case may be, foreign matters attach in the coating step and projections are formed on the surface of the coated surfaces.

However, conventional adhesive sheets using a foam of a butyl rubber, a chloroprene rubber, or a synthetic rubber as the substrate are not susceptible to compressive deformation, whereby a sufficient adhesive area is not obtained at compression or even when the adhesive sheets are liable to be compressively deformed and can insure the initial adhesive area, the adhesive sheets are poor in stress relaxation of the foamed substrate and are partially released due to residual stress. Thus, the member fixed by the adhesive sheet sometimes falls off due to the above causes.

Thus, under the conventional circumstances described above, one object of the present invention is to provide an adhesive sheet with a foamed substrate having an improved adhesive property to rough surfaces.

Occasionally, adhesive sheets with a foamed substrate are exposed to a severe use environment, and in particular, they are exposed to oils. For example, there are cases where after adhering a member to equipment with an adhesive sheet, the adhered portion is splashed with machine oil or the portion is coated with a solvent-series coating material. Also, when the adhesive sheet with a foamed substrate is used for fixing side ornaments of automobiles, there are cases where at oil supplying, spilled gasoline attaches to the fixed portions and an oily removing liquid such as kerosene, which is used for removing a guard wax for protecting coated plates of a new automobile, drops and attaches to the fixed portions.

However, in this kind of adhesive sheets, the sides of the foam layer are liable to be permeated with an oil due to the structure thereof. When the automobiles having fixed side ornaments are exposed to such a circumstance for a long period of time, it sometimes happens that the permeated liquid transfers to the adhesive layer to decrease a cohesive force of the adhesive, and the adhesive property of the adhesive layer is greatly decreased. Also, since stress generated by swelling of the foam by oil absorption concentrates at the edge portion of the adhesive layer, the adhesive layer is partially released. In severe cases, the fixed member falls off.

Thus, in this kind of the adhesive sheets, there is, as a matter of course, a restriction in the use environment.

Another object of the present invention is to provide, under such circumstances, an adhesive sheet with a foamed substrate having improved oil-resistant adhesive property and having less restriction for use by improving the constitution of the substrate comprising a foam.

SUMMARY OF THE INVENTION

As a result of various investigations to attain the first object described above, it has been found that by using a foamed elastomer having a specific compressive load value and stress relaxation ratio as a substrate on which a layer of a pressure-sensitive adhesive is formed, an adhesive sheet with a foamed substrate excellent in the adhesive property to rough surfaces is obtained. The present invention has been completed based on this finding.

A first embodiment of the present invention is an adhesive sheet with a foamed substrate of a sheet-form, a tape-form, etc., comprising a substrate comprising a foamed elastomer having a stress at a 25% compression at 23° C. of from 0.6 to 3.0 kgf/cm$^2$, a stress relaxation ratio after one minute held still of at least 20%, and a layer of a pressure-sensitive adhesive formed on the substrate.

In the present invention, the stress of the foamed elastomer at 25% compression at 23° C. and the press relaxation ratio after one minute held still are measured and calculated by the following sections (1) to (3).

(1) A foamed elastomer sheet having a thickness of from 0.5 to 2.0 mm is cut into a size of 25 mm×25 mm and the cut sheets are laminated in the total thickness of 10 mm±0.5 mm to obtain a test sample.

(2) The test sample is compressed to the thickness of 25% of the original test sample by a foam compression test machine (manufactured by Toyo Poldwin Co.) at a speed of 10 mm/minute in an atmosphere of 23° C., and the load (25% compressive load) at the instant (0 minute held still) and the compressive load after one minute held still are measured.

(3) The stress relaxation ratio is obtained by the following equation:

Stress relaxation ratio (%)=[1−(A−B)/A]×100

A: Compressive load after 0 minute held still.
B: Compressive load after one minute held still.

As a result of further various investigations to attain the second object described above, it has been found that an adhesive sheet with a foamed substrate, wherein when an oil permeates from the side surfaces of the foamed layer, the volume of the foam is scarcely changed and the oil is retained in the foam layer to restrain the transfer of the oil to the adhesive layer side by using a foam of an elastomer mixture comprising a chlorine-containing elastomer added to an oil-absorptive elastomer as the substrate. The present invention has also been completed based on this finding.

A second embodiment of the present invention is an adhesive sheet with a foamed substrate comprising a substrate comprising the foam of a mixture of a chlorine-containing elastomer and an oil-absorptive elastomer, and a layer of a pressure-sensitive adhesive formed on the substrate.

DETAILED DESCRIPTION OF THE INVENTION

In the first embodiment of the present invention, the foamed elastomer is obtained by kneading a composition obtained by kneading an elastomer with a rubber reinforcing agent, a vulcanizing agent, a foaming agent, and an antioxidant as the essential components, then molding the kneaded mixture into a sheet form and vulcanizing and foaming the molding.

In the present invention, the elastomer may be one having a rubbery elasticity at room temperature. There is no particular restriction on the kind of the elastomer used in the present invention. Examples of the elastomer include a natural rubber, a butadiene rubber, a styrene-butadiene rubber, a butyl rubber, a chloroprene rubber, EPM (ethylene-propylene copolymer), EPDM (ethylene-propylene-diethane-polymer), an ethylene-acrylic acid ester copolymer, chlorosulfonated polyethylene, chlorinated polyethylene, a nitrile rubber, a urethane rubber, a polysulfide rubber, an epichlorohydrin rubber, a silicone rubber, a fluorine rubber, a nitrile hydride rubber, and an ethylene-vinyl acetate copolymer. These can be used alone or as mixtures thereof.

Since the adhesive sheets with foamed substrate are used in wide use environmental conditions, it is preferred that the adhesive sheets have a good balance in various durabilities such as an ozone resistance, an ultraviolet ray resistance, a heat resistance, a cold resistance, an oil resistance, a water resistance, an acid resistance, an alkali resistance, etc. From this standpoint, of the elastomers described above, a butyl rubber, a chloroprene rubber, EPM, EPDM, an ethylene acrylic acid ester copolymer, a urethane rubber, an epichlorohydrin rubber, a silicone rubber, and a nitrile hydride rubber are preferred, and an epichlorohydrin rubber is more preferred.

Examples of the epichlorohydrin rubber are an epichlorohydrin homopolymer, an epichlorohydrin-ethylene oxide copolymer, an epichlorohydrin-allyl glycidyl ether copolymer, and an epichlorohydrin-ethylene oxide-allyl glycidyl ether terpolymer. From the points of the ozone resistance and the cold resistance, an epichlorohydrin-ethylene oxide-allyl glycidyl ether terpolymer is preferred. A mixture of the epichlorohydrin-ethylene oxide allyl glycidyl ether terpolymer as the essential component and another kind of epichlorohydrin rubber may be used.

Examples of the rubber reinforcing agent are inorganic reinforcing agents such as carbon black, white carbon (silica), basic magnesium carbonate, activated calcium carbonate, or super-finely ground magnesium silicate, and organic reinforcing agents such as a high styrene resin, a cyclized rubber, a coumarone-indene resin, a phenol-formaldehyde resin, a modified melamine resin, a vinyl-toluene copolymer, lignin, phenol resin fibers, or an alicyclic series petroleum resin.

Examples of the vulcanizing agent are sulfur compounds such as sulfur, sulfur chloride, sulfur dichloride, morpholine disulfide, or alkylphenol disulfide; inorganic vulcanizing agents such as selenium, ruthenium, magnesium oxide, lithage, or zinc white; oximes such as p-quinonedioxime, p,p'-di-benzoylquinonedioxime, tetrachloro-p-benzoquinone, or poly-p-dinitrobenzene; nitroso compounds; polyamines such as hexamethylenediamine, triethylenetetramine, tetraethylenepentamine, hexamethylenediamine carbamate, N,N'-dicinnaminene-1,6-hexanediamine, 4,4'-methylenebis(cyclohexylamine) carbamate, or 4,4'-methylenebis-(2-chloroaniline); organic peroxides such as dicumyl peroxide, t-butylcumyl peroxide, 2,5-dimethyl-2,5-di(t-butyl peroxide)hexane, 2,5-dimethyl-2,5-di(t-butyl peroxide)hexyne-3, 1,3-bis-(t-butylperoxyisopropyl)benzene, 1,1-bis-(t-butylperoxy)-3,3,5-trimethylcyclohexane, or benzoyl peroxide; resinous vulcanizing agents such as an alkylphenol-formaldehyde resin, an alkylphenol sulfide resin, or hexamethoxymethylmelamine resin; polyfunctional (meth)acrylate monomers such as ethylene glycol dimethacrylate, or trimethylolpropane trimethacrylate; triallyl isocyanurate; and 2,4,6-trimercapto-s-tridiane. A suitable compound may be selected from these compounds according to the kind of the elastomer.

For the purpose of shortening the vulcanizing time and lowering the vulcanizing temperature, a suitable vulcanization accelerator such as guanidine accelerators, aldehyde-amine accelerators, aldehyde-ammonia accelerators, thiazole accelerators, sulfenamide accelerators, thiourea accelerators, thiuram accelerators, dithiocarbamate accelerators, or zanthate accelerators may be used together with the vulcanizing agent according to the kind of the vulcanizing agent.

Zinc white, magnesium oxide, etc., may be used as a vulcanization acceleration aid together with the vulcanization accelerator.

Examples of the foaming agent are inorganic foaming agents such as sodium hydrogencarbonate, ammonium hydrogencarbonate, or ammonium carbonate; nitroso compounds such as N,N'-dinitrosopentamethylenetetramine; azo compounds such as azodicarbonamide, or azobisisobutyronitrile; and sulfonylhydrazide compounds such as benzenesulfonylhydrazide, p,p'-oxybis (benzenesulfonylhydrazide, or toluenesulfonylhydrazide. A suitable foaming agent in the above compounds may be selectively used according to the kind of the vulcanizing agent described above. For the purpose of improving the foaming speed and lowering the foaming temperature, a suitable conventional foaming aid may be used according to the kind of the foaming agent.

The antioxidant is preferably a compound which gives less blooming and does not hinder the vulcanization reaction. Examples of the antioxidant are phenyl-α-naphthylamine, 4,4'-(α,α-dimethylbenzyl)diphenylamine, octylated diphenylamine, N-isopropyl-N'-phenyl-p-phenylenediamine, N-phenyl-N'-(3-methacryloyloxy-2-hydroxypropyl)-p-phenylenediamine, polymerization product of 2,2,4-trimethyl-1,2-dihydroquinoline, 2,5-di-t-butylhydroquinone, 2,6-di-t-butyl-4-methylphenol, 2,2'-methylene-bis-(4-methyl-6-t-butylphenol), 4,4'-thiobis-(6-t-butyl-3-methylphenol), 4,4'-butylidenebis-(3-methyl-6-t-butylphenol), and tris(nonylphenyl) phosphite.

In addition to the above-described essential components, various additives, which are usually compounded in rubber moldings, such as a scorch inhibitor, an ultraviolet absorbent, a mastication accelerator, a processing aid, a plasticizer, a rubber softening agent, a filler, a stabilizer, a lubricant, a flame retardant, an antistatic agent, a coloring agent, or an antifungal agent may be compounded with the elastomer.

Kneading of the elastomer and the compounding components may be carried out using conventional equipment for kneading rubber compounding components, such as a mixing role, a bambury mixer, a press kneader, a single screw extruder, or a twin screw extruder.

The sheet of the elastomer may be formed by rolling it by calender rolls or by a die extrusion.

Vulcanization and foaming after forming the sheet can be practiced by passing the sheet through an oven zone or a rotocure.

There is no particular restriction on the thickness of the foamed elastomer sheet thus obtained. The thickness is preferably 0.4 mm to 5 mm. If the thickness of the sheet is too thin, when the adhesive sheet is press-adhered to a rough surface, a sufficient rough surface following property is not obtained and the adhesive property to rough surfaces is reduced. If the thickness of the sheet is larger than the necessary thickness, a further improvement of the characteristics is not obtained.

The present invention is characterized in that the compression properties of the foam elastomer are such that in the compression test at 23° C., the load (stress) at 25% compression is from 0.6 to 3.0 kgf/cm$^2$ and the stress relaxation ratio after one minute held still is at least 20%. That is, by lowering the load at 25% compression as described above, the adhesive area to a rough surface can sufficiently be insured, and by increasing the stress relaxation as described above, the release of the adhesive sheet by a residual stress is restrained. As a result, the adhesive sheet becomes excellent in the holding power of a member to a rough surface.

This point is explained in more detail. Regarding the correlation of the compressive load and the adhesive area to rough surfaces, when, for example, an adhesive sheet using a foamed elastomer as the substrate having a thickness of 1 mm and the load at 25% compression of 3.0 kgf/cm$^2$ is intended to completely adhere to an adherend having a difference of 0.25 mm in level, a pressing force of at least 3.0 kgf/cm$^2$ is required. When the pressing force is less than the above value, it is clear that the adhesive sheet certainly lifts. In other words, if the same pressing force is applied, when the compressive load is less, a larger adhesive area to rough surfaces can be insured.

On the other hand, if the load at 25% compression is larger than 3.0 kgf/cm$^2$, the adhesive area to rough surfaces cannot be sufficiently insured, while if the load at 25% compression is less than 0.6 kgf/cm$^2$, the adhesive sheet is easily compressed by a winding pressure of the adhesive sheet, causing a problem in the dimensional stability of the product. Also, it is necessary in the present invention that the stress relaxation ratio of the foamed elastomer after one minute held still is at least 20%, and preferably at least 30%. This is because when the stress relaxation ratio is less than 20%, that is, the residual stress is over 80%, a releasing force acts to the adhered interface by the residual stress of the foamed substrate deformed by following the rough surface to reduce the adhesive area with the passage of time. As a result, a problem may occur in that the fixed member falls off. In addition, there is no particular restriction on the upper limit of the stress relaxation ratio of the foamed elastomer at 25% compression after one minute held still. However, ideally, the upper limit can be 100%, and is usually about 60%.

For making the compression properties of the foamed elastomer in the ranges of the present invention described above, for example, the kinds and the compounding amounts of the elastomer and the compounding components are suitably selected, and the sizes of bubbles and the population of the bubbles after vulcanization and foaming may be controlled. There is no particular restriction on these methods.

Examples of the chlorine-containing elastomer in the second embodiment of the present invention are an epichlorohydrin rubber, a chloroprene rubber, chlorinated polyethylene, and chlorosulfonated polyethylene. Since these chlorine-containing elastomers have a large polarity, they are not oleophilic, and generally, they are known to be oil resistant rubbers which are difficult to be swelled with oils.

The foamed substrates for the adhesive sheets are required to have a proper rubber elasticity and a proper stress relaxation ratio. In this point, an epichlorohydrin rubber and a chloroprene rubber are preferred, and the epichlorohydrin rubber showing less swelling by oil absorption is more preferred.

Examples of the epichlorohydrin series rubber are an epichlorohydrin homopolymer, an epichlorohydrin-ethylene oxide copolymer, an epichlorohydrin-allyl glycidyl ether copolymer, and an epichlorohydrin-ethylene oxide-allyl glycidyl ether terpolymer. From the points of the ozone resistance and the cold resistance, the epichlorohydrin-ethylene oxide-allyl glycidyl ether terpolymer is preferred. A mixed system of the terpolymer as the essential component and other kind of epichlorohydrin rubber may also be used.

Examples of the oil-absorptive elastomer used in the present invention are polypropylene, a silicone rubber, EPDM (ethylene-propylene-diethane polymer), and EPM (ethylene-propylene copolymer). Polymers having a high oil-absorptive property, such as acryl beads, or crosslinked polystyrene beads can also be used. In these elastomers, from the points of showing a good blend workability with a chlorinated elastomer, being excellent in the uniform foaming property, and giving a property having a proper elasticity and a proper elongation, a silicone rubber, EPM, and EPDM are preferred. Inexpensive EPM and EPDM are more preferred. In addition, the diene component of EPDM may be DCPD (dicyclopentadiene) or may be ENB (ethylidenenorbornene).

In the present invention, a mixture of the chlorine-containing elastomer and the oil-absorptive elastomer is used. The proportion of both the elastomers used is that a weight ratio of chlorine-containing elastomer/oil-absorptive elastomer is from 50/50 to 95/5, and preferably from 60/40 to 85/15.

If the content of the chlorine-containing elastomer is too small, swelling at oil absorption is large, stresses are concentrated to the edge portion of the adhesive layer, and the layer becomes easily released. On the contrary, if the content of the oil-absorptive elastomer is too small, the oil retention ability in the foam layer is insufficient and the oil transfers from the foam layer which is not oleophilic to the adhesive layer which is oleophilic with the passage of time, thus decreasing the cohesive force of the adhesive reducing the adhesive property.

In the second embodiment of the present invention, the foam (foamed elastomer) can be obtained by kneading the mixture of the chlorine-containing elastomer and the oil-absorptive elastomer described above with a rubber reinforcing agent, a vulcanizing agent, a foaming agent, and an antioxidant as compounding components, molding the kneaded mixture into a sheet form, and vulcanizing and foaming the molding.

There are no particular restrictions on the thickness and the porosity of the foamed sheet. Usually, the thickness of the sheet is from 0.3 mm to 5 mm and the porosity thereof is from 20% to 80%.

In this embodiment, the rubber reinforcing agent, the vulcanizing agent, the foaming agent, the antioxidant, and, if necessary, other components, and the kneading method can be the compounds and method as in the first embodiment of the present invention.

In the selection of the vulcanizing agent, a vulcanizing agent which co-vulcanizes the chlorine-containing elastomer and the oil-absorptive elastomer may be used or a vulcanizing agent which vulcanizes only the chlorine-containing elastomer may be used.

The adhesive sheet of the present invention is prepared by using such a foam (foamed elastomer) as the substrate, forming a layer composing a pressure-sensitive adhesive on one surface or both surfaces of the substrate in a desired thickness, and forming it into a sheet form or a tape form.

There is no particular restriction on the kind of the pressure-sensitive adhesive used in the present invention. A rubber adhesive, an acryl adhesive, or a silicone adhesive may be used. There is also no restriction on the thickness of the layer of the pressure-sensitive adhesive. Thicknesses usually applied to conventional adhesive sheets may be employed. For example, the thickness may be from about 10 to 2,000 μm. When the pressure-sensitive adhesive layer is formed on both surfaces of the substrate, the kind, the thickness, and various properties of the layer may be the same or different in both sides.

Methods for forming the layer of the pressure-sensitive adhesive on the substrate are a method of directly coating the pressure-sensitive adhesive on the substrate, a method of forming a layer of the pressure-sensitive adhesive having a definite thickness on a separator, and laminating the pressure-sensitive adhesive layer (having the separator) thus formed on the substrate. In these methods, an undercoat treatment, a corona discharging treatment, an electron ray treatment, etc., may be previously applied to the surface(s) of the substrate in order to improve the anchoring property of the pressure-sensitive adhesive layer.

The present invention is described in more detail by reference to the examples together with the reference examples. In the examples and the reference examples, all parts are by weight unless otherwise indicated.

REFERENCE EXAMPLE 1-1

Using an epichlorohydrin-ethylene oxide-allyl glycidyl ether terpolymer (Epichlomer CG, trade name, made by DAISO Co., LTD.), the following compounded composition 1-A was prepared. After kneading the composition by mixing rolls, the kneaded composition was rolled to form a sheet having a thickness of 0.6 mm. The sheet was then heated to 150° C. for 30 minutes to vulcanize and foam the sheet. As a result, a foamed elastomer 1-A having a thickness of 0.75 mm was obtained.

Compounded Composition 1-A

| Epichlomer CG | 100 parts |
| Carbon Black | 20 parts |
| Calcium Carbonate | 50 parts |
| Dioctyl Phthalate | 5 parts |
| Magnesium Oxide | 5 parts |
| Ethylenethiourea | 1.5 parts |
| N,N'-Dinitrosopentamethylenetetramine | 4 parts |
| Urea Foaming Aid | 3 parts |

-continued

| Polymer of 2,2,4-Trimethyl-1,2 Dihydroquinone | 3 parts |
| Stearic Acid | 1 part |

REFERENCE EXAMPLE 1-2

A foamed elastomer 1-B having a thickness of 2 mm was obtained in the same manner as in Reference Example 1-1 except that the following compounded composition 1-B was used in place of the compounded composition 1-A and the thickness of the rolled sheet was changed to 0.85 mm.

Compounded Composition 1-B

| Epichlomer CG | 100 parts |
| Carbon Black | 30 parts |
| Calcium Carbonate | 50 parts |
| Dioctyl Phthalate | 5 parts |
| Zinc White | 5 parts |
| Ethylenethiourea | 1.5 parts |
| N,N'-Dinitrosopentamethylenetetramine | 5 parts |
| Urea Foaming Aid | 3 parts |
| Polymer of 2,2,4-Trimethyl-1,2-Dihydroquinoline | 3 parts |
| Stearic Acid | 1 part |

REFERENCE EXAMPLE 1-3

A foamed elastomer 1-C having a thickness of 0.8 mm was obtained in the same manner as in Reference Example 1-1 except that the following compounded composition 1-C was used in place of the compounded composition 1-A and the thickness of the rolled sheet was changed to 0.7 mm.

Compounded Composition 1-C

| Epichlomer CG | 100 parts |
| Carbon Black | 10 parts |
| Calcium Carbonate | 50 parts |
| Dioctyl Phthalate | 5 parts |
| Zinc White | 5 parts |
| Ethylenethiourea | 2 parts |
| N,N'-Dinitrosopentamethylenetetramine | 2 parts |
| Urea Foaming Aid | 1 part |
| Polymer of 2,2,4-Trimethyl-1,2-Dihydroquinoline | 3 parts |
| Stearic Acid | 1 part |

REFERENCE EXAMPLE 1-4

A foamed elastomer 1-D having a thickness of 0.8 mm was obtained in the same manner as in Reference Example 1-1 except that the following compounded composition 1-D prepared using Butyl Rubber 365 (made by Esso Co.) was used in place of the compounded composition 1-A and the thickness of the rolled sheet was changed to 0.65 mm.

Compounded Compound 1-D

| Butyl Rubber 365 | 100 parts |
| Carbon Black | 35 parts |
| Calcium Carbonate | 40 parts |
| Paraffin Oil (P-200, trade name, made by Nippon Petroleum Co.) | 10 parts |
| Magnesium Oxide | 5 parts |
| Zinc White | 5 parts |
| p-Quinonedioxime | 1 part |
| N,N'-Dinitropentamethylenetetramine | 5 parts |

-continued

| | |
|---|---|
| Urea Foaming Aid | 4 parts |
| Polymer of 2,2,4-Trimethyl-1,2-Dihydroquinoline | 3 parts |
| Stearic Acid | 1 part |

REFERENCE EXAMPLE 1-5

A foamed elastomer 1-E having a thickness of 0.8 mm was obtained in the same manner as in Reference Example 1-1 except that the following compounded composition 1-E was used in place of the Compounded Composition 1-A and the thickness of the rolled sheet was changed to 0.75 mm.
Compounded Composition 1-E

| | |
|---|---|
| Epichlomer CG | 100 parts |
| Carbon Black | 10 parts |
| Calcium Carbonate | 50 parts |
| Dioctyl Phthalate | 5 parts |
| Zinc White | 5 parts |
| Ethylenethiourea | 1 part |
| N,N'-Dinitropentamethylenetetramine | 1 part |
| Urea Foaming Aid | 0.5 part |
| Polymer of 2,2,4-Trimethyl-1,2-Dihydroquinoline | 3 parts |
| Stearic Acid | 1 part |

REFERENCE EXAMPLE 1-6

The foamed elastomer 1-F having a thickness of 0.8 mm was obtained in the same manner as in Reference Example 1-1 except that the compounded composition 1-F prepared using Butyl Rubber 365 (made by Esso Co.) was used in place of compounded composition 1-A and the thickness of the sheet was changed to 0.65 mm.
Compounded Composition 1-F

| | |
|---|---|
| Butyl Rubber 365 | 100 parts |
| Carbon Black | 35 parts |
| Calcium Carbonate | 40 parts |
| Paraffin Series Oil (P-200, trade name, made by Nippon Petroleum Co., Ltd.) | 10 parts |
| Magnesium Oxide | 5 parts |
| Zinc White | 5 parts |
| p-Quinonedioxime | 3 parts |
| N,N'-Dinitropentamethylenetetramine | 5 parts |
| Urea Foaming Aid | 4 parts |
| Polymer of 2,2,4-Trimethyl-1,2-Dihydroquinoline | 3 parts |
| Stearic Acid | 1 part |

REFERENCE EXAMPLE 1-7

A commercially available polyethylene-type (vinyl acetate content: about 17% by weight) foamed sheet having a thickness of 1.1 mm was used as a foamed elastomer 1-G.

Each of the foamed elastomers 1-A to 1-G in Reference Examples 1-1 to 1-7 described above was cut into the size of 25 mm×25 mm, and the cut sheets each were laminated such that the total thickness was 10 mm±0.5 mm to obtain each test sample. When each sample was compressed to 25% of the original thickness by a compression test machine at a speed of 10 mm/minute, the compression load after 0 minute held still and the compression load after 1 minute held still were measured. Further the stress relaxation ratio after one minute held still was obtained from the measured values.

The measurement and calculated results obtained are shown in Table 1-1 below together with the thicknesses of the foamed elastomers 1-A to 1-G.

TABLE 1-1

| Reference Example | Foamed Elastomer | | 25% Compression Load (kgf/cm$^2$) | | Stress Relaxation |
|---|---|---|---|---|---|
| | Kind | Thickness (mm) | After 0 Minute Held Still | After 1 Minute Held Still | After 1 Minute Held Still (%) |
| 1-1 | 1-A | 0.75 | 1.34 | 0.88 | 34 |
| 1-2 | 1-B | 1.2 | 0.83 | 0.57 | 31 |
| 1-3 | 1-C | 0.8 | 2.54 | 1.85 | 27 |
| 1-4 | 1-D | 0.8 | 0.69 | 0.54 | 22 |
| 1-5 | 1-E | 0.8 | 4.5 | 3.51 | 22 |
| 1-6 | 1-F | 0.8 | 0.69 | 0.59 | 15 |
| 1-7 | 1-G | 1.1 | 1.00 | 0.9 | 10 |

Example 1-1

The foamed elastomer 1-A obtained in Reference Example 1-1 was used as a substrate. An undercoat treatment by the method shown below was applied onto both the surfaces of the substrate, and a sheet having the layer of a pressure-sensitive adhesive having a thickness of 70 μm prepared by the method described below was laminated on both surfaces of the substrate to obtain an adhesive tape with the foamed substrate.
Undercoat Treatment The following undercoat treatment liquid was prepared using Adeka Bontighter (trade name, made by ASAHI DENKA KOGYO K.K.). The liquid was coated on both surfaces of the substrate composed of the foamed elastomer 1-A at a dry coated amount of about 1 μm/m$^2$, and dried at 120° C. for 5 minutes.

| | |
|---|---|
| Adeka Bontighter HUX-290H (aqueous urethane resin) | 100 parts |
| Adeka Bontighter HUX-11W | 3 parts |
| Adeka Bontighter HUX-XW | 5 parts |
| Water | 500 parts |

Preparation of Sheet having Pressure-Sensitive Adhesive Layer

In a flask were placed 92 parts of 2-ethylhexyl acrylate, 8 parts of acrylic acid, 0.2 part of N,N'-azobisisobutyronitrile, and 200 parts of ethyl acetate. After replacing the inside atmosphere with nitrogen, the resulting mixture was stirred at 50° C. for 20 hours to conduct polymerization. After adding 1% by weight of a tolylene diisocyanate addition product of trimethylolpropane to the polymer solution thus obtained, the resulting mixture was coated on a release paper and subjected to a drying treatment at 130° C. for 5 minutes to obtain a sheet having the layer of a pressure-sensitive adhesive having a thickness of 70 μm.

Example 1-2

An adhesive tape with the foamed substrate was obtained in the same manner as in Example 1-1 except that the foamed elastomer 1-B obtained in the Reference Example 1-2 was used as the substrate.

Example 1-3

An adhesive tape with the foamed substrate was obtained in the same manner as in Example 1-1 except that the foamed elastomer 1-C obtained in the Reference Example 1-3 was used as the substrate.

Example 1-4

An adhesive tape with the foamed substrate was obtained in the same manner as in Example 1-1 except that the foamed elastomer 1-D obtained in the Reference Example 1-4 was used as the substrate.

Comparative Example 1-1

An adhesive tape with the foamed substrate was obtained in the same manner as in Example 1-1 except that the foamed elastomer 1-E obtained in the Reference Example 1-5 was used as the substrate.

Comparative Example 1-2

An adhesive tape with the foamed substrate was obtained in the same manner as in Example 1-1 except that the foamed elastomer 1-F obtained in the Reference Example 1-6 was used as the substrate.

Comparative Example 1-3

An adhesive tape with the foamed substrate was obtained in the same manner as in Example 1-1 except that the foamed elastomer 1-G obtained in the Reference Example 1-7 was used as the substrate.

Test for the adhesive property to a rough surface was carried out on each of the adhesive tapes each with the foamed substrate obtained in Examples 1-1 to 1-4 and Comparative Examples 1-1 to 1-3 in the following manner.

Adhesive Property to Rough Surface Test

One surface of each adhesive tape with foamed substrate cut into a size of 25 mm×100 mm was adhered to a surface of a stainless steel plate (200 g) of 4 mm×50 mm×130 mm under an atmosphere of 23° C., and the other surface of the adhesive tape was press-adhered to a glass plate having uneven surface ("Kasumi", trade name, made by Nippon Sheet Glass Company, Limited) by one way pressing with a roller of 1 kg. Immediately after press-adhering, the ratio of the area of the adhesive tape practically adhered to the glass was measured from the opposite surface of the glass plate. The glass plate was then stood perpendicularly and allowed to stand, and change of the adhered areas after 7 days and 14 days was examined.

The test results obtained are shown in Table 1-2 below.

TABLE 1-2

| | Adhered Area Ratio (%) | | |
|---|---|---|---|
| | Immediately After Press-Adhering | After 7 Days | After 14 Days |
| Example 1 | 85 | 85 | 85 |
| Example 2 | 95 | 95 | 95 |
| Example 3 | 80 | 76 | 72 |
| Example 4 | 95 | 86 | 81 |
| Comparative Example 1 | 70 | 65 | Fallen off |
| Comparative Example 2 | 95 | 78 | 64 |
| Comparative Example 3 | 90 | 65 | Fallen off |

It is clear from the results shown in Table 1-2 above that the adhesive tapes with foamed substrate obtained in Examples 1-1 to 1-4 can take a large adhered area for an adherend having a rough surface at press-adhering and shows less reduction of the adhered area with the passage of days. Hence the adhesive tapes are very excellent in the holding power of a member to a rough surface.

REFERENCE EXAMPLE 2-1

The following compounded composition 2-A was prepared using an epichlorohydrin rubber (Gechron 3100, trade name, made by Nippon Zeon Co., Ltd.) as a chlorine-containing elastomer and EPDM (EPT-4021, trade name, made by Mitsui Petrochemical Industries, Ltd.). After kneading the composition by a mixing roll, the kneaded composition was rolled into a sheet having a thickness of 0.6 mm. The sheet was then vulcanized and foamed by heating to 150° C. for 30 minutes to obtain a foamed elastomer 2-A having a thickness of 0.75 mm.

Compounded Composition 2-A

| | |
|---|---|
| Gechron 3100 | 80 parts |
| EPT-4021 | 20 parts |
| Carbon Black | 20 parts |
| Calcium Carbonate | 50 parts |
| Dioctyl Phthalate | 5 parts |
| Magnesium Oxide | 5 parts |
| Ethylenethiourea | 1.5 parts |
| N,N'-Dinitrisopentamethylenetetramine | 4 parts |
| Urea Foaming Aid | 3 parts |
| Polymer of 2,2,4-Trimethyl-1,2-Dihydroquinoline | 3 parts |
| Stearic Acid | 1 part |

REFERENCE EXAMPLE 2-2

A foamed elastomer 2-B having a thickness of 0.75 mm was obtained in the same manner as in Reference Example 2-1 except that in the compounded composition in Reference Example 2-1, the ratio of Gechrom 3100/EPT-4021 was changed to 65 parts/35 parts.

REFERENCE EXAMPLE 2-3

The following compounded composition 2-C was prepared using Butyl Rubber 365 (trade name, made by Esso Co.) by kneading, sheet-forming, vulcanizing, and foaming the composition in the same manner as in Reference Example 2-1, a foamed elastomer 2-C having a thickness of 0.75 mm was obtained.

Compounded Composition 2-C

| | |
|---|---|
| Butyl Rubber 365 | 100 parts |
| Carbon Black | 35 parts |
| Calcium Carbonate | 40 parts |
| Paraffin Oil (P-200, trade name, made by Nippon Oil Company, Ltd.) | 10 parts |
| Magnesium Oxide | 5 parts |
| Zinc White | 5 parts |
| p-Quinondioxime | 1 part |
| N,N'-Dinitrosopentamethylenetetramine | 5 parts |
| Urea Foaming Agent | 4 parts |
| Polymer of 2,2,4-Trimethyl-1,2-Dihydroquinoline | 3 parts |
| Stearic Acid | 1 part |

REFERENCE EXAMPLE 2-4

A commercially available polyethylene-type (vinyl acetate content: about 17% by weight) foamed sheet having a thickness of 0.8 mm was used as a foamed elastomer 2-D.

Example 2-1

The foamed elastomer 2-A obtained in Reference Example 2-1 was used as the substrate. Undercoat treatment was applied to both surfaces of the substrate by the method described in Example 1-1 above. The sheet having the layer of the pressure-sensitive adhesive of 70 µm prepared by the method described in Example 1-1 above was laminated on the substrate to obtain an adhesive tape with a foamed substrate.

Example 2-2

An adhesive tape with the foamed substrate was obtained in the same manner as in Example 2-1 except that the foamed elastomer 2-C obtained in Reference Example 2-3 was used as the substrate.

Comparative Example 2-2

An adhesive tape with the foamed substrate was obtained in the same manner as in Example 2-1 except that the foamed elastomer 2-D obtained in Reference Example 2-4 was used as the substrate.

Oil absorption by the immersion in oil and the swelling property (change of thickness) were examined on each of the adhesive tapes each with the foamed substrate obtained in Examples 2-1 and 2-2 and Reference Examples 2-1 and 2-2 in the following method, as one of oil resistant tests.

Measurement of Oil Absorption and Observation of Swelling Property

A polyester film having a thickness of 50 µm subjected to an undercoat treatment was adhered to both surfaces of each adhesive tape (10 mm×100 mm) with the foamed substrate under the atmosphere of 23° C., and the assembly was allowed to stand for 24 hours to obtain a sample.

For the sample immersed in kerosene for one hour under the atmosphere of 23° C. (after immersion) and the sample spontaneously dried for one day after immersion (after 1 day), the oil absorption was measured by the change of the weight of the sample. Also, the change of the thickness of the side portion of the adhesive tape was observed with microscope as the swelling property, and the difference of the thickness before immersing in kerosene was obtained.

The results obtained are shown in Table 2-1 below.

TABLE 2-1

|  | Oil Absorption (mg) | | Swelling Property (Changed amount of the thickness) (mm) | |
| --- | --- | --- | --- | --- |
|  | After Immersion | After 1 Day | After Immersion | After 1 Day |
| Example 2-1 | 72 | 45 | 0.08 | 0.07 |
| Example 2-2 | 80 | 48 | 0.09 | 0.07 |
| Comparative Example 2-1 | 95 | 57 | 0.25 | 0.12 |
| Comparative Example 2-2 | 40 | 22 | 0.05 | 0.02 |

For each of the adhesive tapes each with the foamed substrate obtained in Examples 2-1 and 2-2 and Comparative Examples 2-1 and 2-2, the change of the adhesive force before and after immersing in an oil was determined by the following method, as other oil-resisting test.

Measurement of Adhesive Force

A polyester film having a thickness of 50 µm subjected to an undercoat treatment was adhered to one surface of each adhesive tape (10 mm×100 mm) with the foamed substrate under the atmosphere of 23° C. The opposite side of the adhesive tape was press-adhered to the surface of a stainless steel plate by one-way pressing with a roller of 2 kg. The assembly was allowed to stand for 24 hours to obtain a sample.

For the sample before immersing in kerosene (before immersion), the sample immersed in kerosene for one hour under the atmosphere of 23° C. (after immersion), and the sample spontaneously dried for one day after immersion (after 1 day), the releasing adhesive force was measured with a universal tension tester at 180° C. in the condition of a releasing speed of 50 mm/minute under the atmosphere of 23° C.

The results obtained are shown in Table 2-2 below.

TABLE 2-2

|  | Adhesive Force (g/10 mm width) | | |
| --- | --- | --- | --- |
|  | Before Immersion | After Immersion | After 1 Day |
| Example 2-1 | 1,300 | 1,150 | 1,080 |
| Example 2-2 | 1,400 | 1,300 | 1,250 |
| Comparative Example 2-1 | 980 | 450 | 400 |
| Comparative Example 2-2 | 800 | 800 | 250 |

It can be seen from the results shown in Table 2-1 and Table 2-2 above that in the adhesive tapes each with the foamed substrate obtained in Examples 2-1 and 2-2, even when an oil permeates from the side surfaces of the foam layer, the volume change of the foam layer is small, and since the adhesive tape has a function of restraining the transfer of the permeated oil into the adhesive layer by retaining the permeated oil with the foam layer, decrease of the adhesive force with the passage of time is very small, showing that the adhesive tapes of the present invention are very excellent in the oil-resistant adhesive property.

As described above, since the adhesive sheets with a foamed substrate of the present invention use the foamed elastomer having the compression property in the specific range as the substrate, the adhesive sheets easily deform following the rough surface of an adherend and easily insure the adhered area. Also, since a problem of causing releasing by a residual stress to fall off a fixed member does not occur due to a high stress relaxation, the adhesive sheets show an improved holding power of a member.

Further, since in the present invention, the foam of a mixture of a chlorine-containing elastomer and an oil-absorptive elastomer is used as the substrate, the adhesive sheets with a foamed substrate having an improved oil resistant adhesive property and having less restriction on use can be provided.

While the invention has been described in detail and with reference to specific embodiments thereof, it will be apparent to one skilled in the art that various changes and modifications can be made therein without departing from the spirit and scope thereof.

What is claimed is:

1. An adhesive sheet with a foamed substrate comprising a substrate comprising a foamed elastomer having a stress at 25% compression at 23° C. of from 0.6 to 3.0 kgf/cm$^2$ and a stress relaxation ratio after one minute held still of at least 20%, and a layer of a pressure-sensitive adhesive formed on the substrate.

2. The adhesive sheet with a foamed substrate as claimed in claim 1, wherein the foamed elastomer comprises an epichlorohydrin rubber.

3. An adhesive sheet with a foamed substrate comprising a substrate comprising a foam of a mixture of a chlorine-containing elastomer and an oil-absorptive elastomer in a ratio of from 50/50 to 95/5, and a layer of a pressure-sensitive adhesive formed on the substrate.

4. The adhesive sheet with a foamed substrate as claimed in claim 3, wherein the chlorine-containing elastomer is an epichlorohydrin rubber.

5. The adhesive sheet with a foamed substrate as claimed in claim 3, wherein the oil-absorptive elastomer is at least one member selected from the group consisting of polypropylene, a silicone rubber, EPDM, and EPM.

* * * * *